US006819166B1

(12) United States Patent
Choi et al.

(10) Patent No.: US 6,819,166 B1
(45) Date of Patent: Nov. 16, 2004

(54) CONTINUOUS-TIME, LOW-FREQUENCY-GAIN/HIGH-FREQUENCY-BOOSTING JOINT ADAPTATION EQUALIZER AND METHOD

(75) Inventors: Jong-Sang Choi, Seoul (KR); Moon-Sang Hwang, Yong-In-Si (KR); Deog-Kyoon Jeong, Seoul (KR)

(73) Assignee: Silicon Image, Inc., Sunnyvale, CA (US)

( * ) Notice: Subject to any disclaimer, the term of this patent is extended or adjusted under 35 U.S.C. 154(b) by 0 days.

(21) Appl. No.: 10/403,477

(22) Filed: Mar. 31, 2003

Related U.S. Application Data

(60) Provisional application No. 60/437,856, filed on Jan. 3, 2003.

(51) Int. Cl.[7] .................................................. H03O 1/00
(52) U.S. Cl. ....................................... 327/551; 327/552
(58) Field of Search ................................. 327/551, 552, 327/553, 554, 555, 558, 559; 381/98, 104

(56) References Cited

U.S. PATENT DOCUMENTS 5,371,803 A * 12/1994 Williamson, III ........... 381/104
5,574,791 A * 11/1996 Orban ......................... 381/98
6,680,632 B1 * 1/2004 Meyers et al. ............... 327/155

OTHER PUBLICATIONS

Babanezhad, Joseph N. "*A 3.3V Analog Adaptive Line-–Equalizer For Fast Ethernet Data Communication,*" *IEEE Custom Integrated Circuits Conference*, pp. 343–346, 1998.
Hartman, Gregory P., et al., "*Continuous–Time Adaptive–Analog Coaxial Cable Equalizer in 0.5μm CMOS,*" *IEEE International Symposium on Circuits and Systems*, pp. 97–100, 1999.

* cited by examiner

*Primary Examiner*—Linh M. Nguyen
(74) *Attorney, Agent, or Firm*—Girard & Equitz LLP

(57) ABSTRACT

In a class of embodiments, an adaptive equalization circuit that implements a joint adaptation algorithm. Other embodiments are receivers that include such an adaptive equalization circuit, and joint adaptation equalization methods. The equalization circuit includes a filter having a low-frequency-gain path (sometimes referred to as a low-frequency filter) and a high-frequency-boosting path (sometimes referred to as a high-frequency filter). The high-frequency filter typically includes a high-pass filter in series with an amplifier having adjustable gain. A high-frequency-boosting tuning loop controls the adjustable gain applied by the high-frequency filter. A low-frequency-gain tuning loop controls the adjustable gain applied by the low-frequency filter.

32 Claims, 11 Drawing Sheets

CONTINUOUS-TIME, LOW-FREQUENCY-GAIN/HIGH-FREQUENCY-BOOSTING JOINT ADAPTATION EQUALIZER AND METHOD

CROSS-REFERENCE TO RELATED APPLICATION

This application claims the benefit of U.S. Provisional Application No. 60/437,856, filed Jan. 3, 2003, entitled "CMOS 3.5 GBPS CONTINUOUS-TIME, LOW-FREQUENCY-GAIN/HIGH-FREQUENCY-BOOSTING JOINT ADAPTATION EQUALIZER AND METHOD."

FIELD OF THE INVENTION

The invention pertains to methods and circuits for adaptive equalization of signals transmitted over a link (e.g., over a cable).

BACKGROUND OF THE INVENTION

The term "transmitter" is used herein in a broad sense to denote any device capable of transmitting data over a link (e.g., a serial link), and optionally also capable of performing additional functions which can include encoding and/or encrypting the data to be transmitted. The term "receiver" is used herein in a broad sense to denote any device capable of receiving data that has been transmitted over a link (e.g., a serial link), and optionally also capable of performing additional functions, which can include decoding and/or decryption of the received data, and other operations related to decoding, reception, or decryption of the received data. For example, the term receiver can denote a transceiver that performs the functions of a transmitter as well as the functions of a receiver.

During high-speed serial data transmission over a link (e.g., a cable and/or PCB traces and/or connectors), the link itself introduces losses and dispersion which reduce the signal quality at the receiver end. As the frequency of the transmitted signal and/or the transmission distance increases, the distortion due to frequency dependent delay and attenuation increases, increasing the chance of false detection of signals received and in some cases making the eye at the receiver almost unusable.

Transmission of signals indicative of data (e.g., video or audio data) to a receiver over a serial link degrades the data, for example by introducing time delay error (sometimes referred to as jitter) to the data. In effect, a link applies a filter to the signals during propagation over the link. The filter (sometimes referred to as a "cable filter," although the link may consist of or include PCB traces) can cause inter-symbol interference (ISI).

Equalization is the application of an inverted version of a cable filter to signals received after propagation over a link. The function of an equalization filter (sometimes referred to as an "equalizer") is to compensate for, and preferably cancel, the cable filter.

Adaptive equalization has been used to restore signal integrity by compensating for the frequency dependent attenuation that occurs in high speed serial data transmission. Various methods have been developed for adaptive equalization.

FIG. 1 is a block diagram of a conventional continuous-time adaptive cable equalizer, of a type described in J. N. Babanezhad, "A 3.3-V Analog Adaptive Line-Equalizer for Fast Ethernet Data Connection," *IEEE CICC*, pp. 343–346, 1998, and in G. P. Hartman et al., "Continuous-Time Adaptive-Analog Coaxial Cable Equalizer in 0.5 µm CMOS," *IEEE ISCAS*, pp. 97–100, 1999. In use, the equalizer is included in a receiver that is coupled to receive a signal that has propagated over a cable. The received signal (labeled "in" in FIG. 1) is filtered in low-frequency-gain path 1 (sometimes referred to as low-frequency filter 1) and high-frequency-boosting path 2 (sometimes referred to as high-frequency filter 2, and which includes a high-pass filter in series with an amplifier having adjustable gain). In some implementations, filter 1 applies gain (which can be unity gain) to the received signal. In other implementations (in which filter 1 includes a low-pass filter), filter 1 applies gain to low-frequency components of the received signal but not to high-frequency components thereof. The outputs of filters 1 and 2 are combined in adder 4, the output of adder 4 enters regulating comparator 6, and the output of comparator 6 is limited to have a predefined maximum amplitude. To decide the amount of high-frequency-boost applied by filter 2, a servo loop compares the slope of the comparator's input signal against that of the comparator's output (the input to comparator 6 is filtered in high-pass filter 5, the output of filter 5 is asserted to rectifier 7, the output of comparator 6 is filtered in high-pass filter 8, the output of filter 8 is asserted to rectifier 9, and error amplifier 10 asserts to the adjustable-gain element of high-frequency filter 2 an equalization control signal indicative of the difference between the outputs of rectifiers 9 and 7). The control signal asserted by error amplifier 10 tries to make the slope of the comparator's input and output signals the same. The difference between the slope of the comparator's input and output signals is measured by comparing high-pass-filtered (and rectified) versions of the comparator's input and output signals using error amplifier 10 as shown in FIG. 1.

The signals asserted to the inputs of error amplifier 10 are related to the amplitudes of the input and output signals of comparator 6. The amplitude of the output of comparator 6 is determined by the amplitude of the input to, and the regulation performed by, comparator 6. The amplitude of the input to comparator 6 is determined by the combination of the transmitter's driving voltage amplitude, the cable's flat loss and frequency-dependent low-frequency attenuation, and the gain of the filter's low-frequency path 1. If the signal amplitudes at the input and output of comparator 6 are different, the high frequency component of the difference between the signals at the input and output of comparator 6 is not a function only of channel attenuation and the high-frequency boosting applied by high-frequency filter 2. Rather, the high frequency component of the difference between the signals at the input and output of comparator 6 is affected by comparator 6's regulation level and the overall low-frequency gain applied by filters 1 and 2. If the low frequency gain deviates from the ideal one, the result of high-frequency-boosting adaptation will be degraded. To eliminate this source of degradation, a joint adaptation algorithm is implemented in accordance with the invention, to adapt not only high frequency content but also low frequency content.

SUMMARY OF THE INVENTION

In a class of embodiments, the invention is an adaptive equalization circuit that implements a joint adaptation algorithm. The equalization circuit includes a filter having a low-frequency-gain path (sometimes referred to as a low-frequency filter) and a high-frequency-boosting path (sometimes referred to as a high-frequency filter). The high-frequency filter typically includes a high-pass filter in series with an amplifier having adjustable gain. A high-frequency-boosting tuning loop controls the adjustable gain applied by the high-frequency filter. A low-frequency-gain tuning loop controls the adjustable gain applied by the low-frequency filter.

Preferably, the high-frequency-boosting tuning loop includes the high-frequency filter, a comparator (e.g., a regulating comparator), a first high-pass filter coupled to the input of the comparator, a second high-pass filter coupled to the output of the comparator, a first rectifier coupled to the output of the first high-pass filter, a second rectifier coupled to the output of the second high-pass filter, and an error amplifier for generating an equalization control signal in response to the outputs of the first rectifier and the second rectifier. Preferably, the low-frequency-boosting tuning loop includes the low-frequency filter, the comparator, a first low-pass filter coupled to the input of the comparator, a second low-pass filter coupled to the output of the comparator, a third rectifier coupled to the output of the first low-pass filter, a fourth rectifier coupled to the output of the second low-pass filter, and a second error amplifier for generating an second equalization control signal in response to the outputs of the third rectifier and the fourth rectifier.

Other aspects of the invention are a receiver that includes any embodiment of the inventive adaptive equalization circuit, and a joint adaptation equalization method.

DETAILED DESCRIPTION OF THE INVENTION

Figure 1:
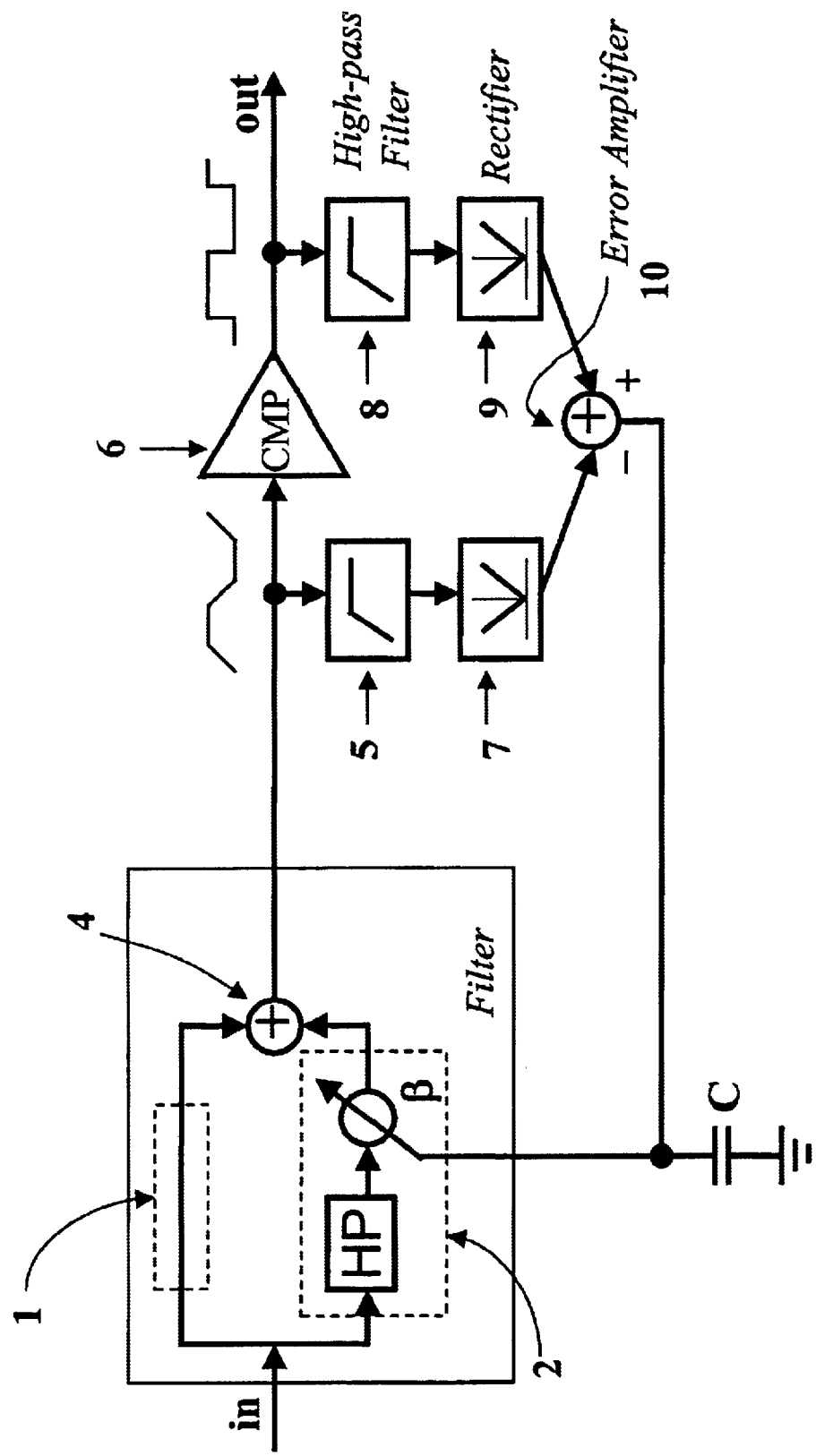
FIG. 1 is a block diagram of a conventional adaptive equalizer, which can be implemented in a receiver.
Figure 2:
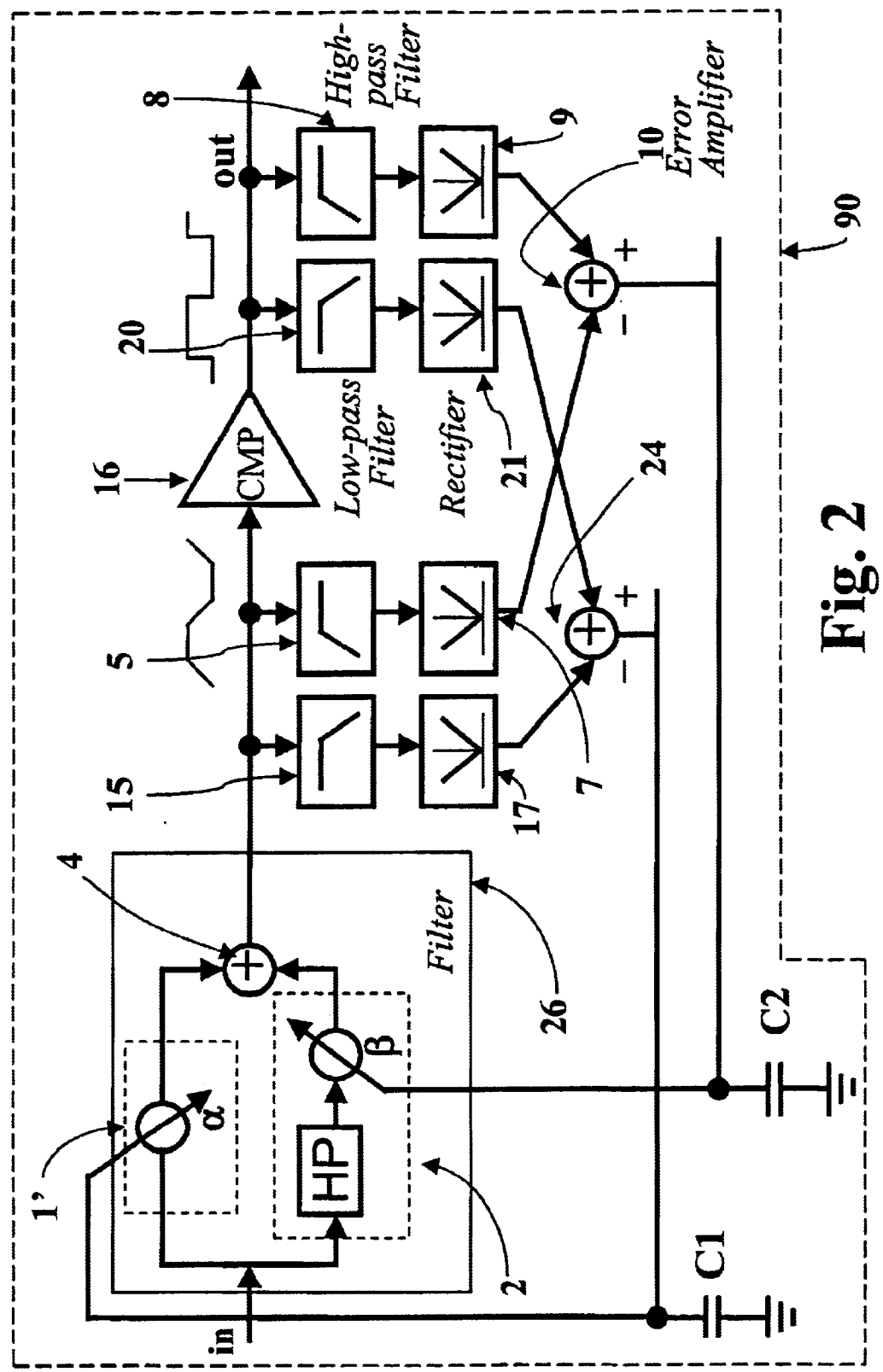
FIG. 2 is a simplified block diagram of a receiver which includes an embodiment of the adaptive equalizer of the invention.

FIG. 2 is a block diagram of a receiver (identified by reference numeral 90) which includes an embodiment of the inventive adaptive equalizer. In use, receiver 90 is coupled to receive the signal labeled "in." The received signal "in" is typically a signal that has propagated over a cable. The elements of FIG. 2 that are identical to corresponding elements of FIG. 1 are numbered identically in FIGS. 1 and 2. In FIG. 2, the high-frequency-boosting tuning loop (comprising filter 2, comparator 6, high-pass filters 5 and 8, rectifiers 7 and 9, and error amplifier 10) is the same as in the conventional architecture of FIG. 1. However, the FIG. 2 circuit includes low-frequency filter 1' (sometimes referred to as "low-frequency gain path" 1') in place of low-frequency filter 1 of FIG. 1. Elements 1', 2, and 4 of FIG. 2 are collectively referred to as "filter" 26. In some implementations, filter 1' applies variable gain to the received signal. In other implementations (in which filter 1' implements a low-pass filtering function), filter 1' applies variable gain to low-frequency components of the received signal and fixed gain (e.g., unit gain) to high-frequency components of the received signal.

The FIG. 2 circuit also includes a low-frequency-gain tuning loop (comprising filter 1', comparator 16, low-pass filters 15 and 20, rectifiers 17 and 21, and error amplifier 24) which compares low-pass filtered, rectified versions of the signals at the input and output of comparator 16 to adjust the low-frequency gain of low-frequency-gain path 1' of filter 26. The low-frequency-gain tuning loop of FIG. 2 is a servo loop. Capacitor C2 of FIG. 2 (connected between the output of error amplifier 10, which is coupled to the adjustable-gain element of filter 2, and ground) replaces capacitor C of FIG. 1. Capacitor C1 of FIG. 2 is connected between the output of error amplifier 24 (which is coupled to an adjustable-gain element of filter 1') and ground.

Filter 1' together with adder 4 can be considered as a low-frequency filter, and filter 2 together with adder 4 can be considered as a high-frequency filter, with adder 4 being a circuit element shared by the low-frequency filter and the high-frequency filter. It should be appreciated that variations on filter 26 of FIG. 2 do not include separate elements 1', 2, and 4 connected as shown in FIG. 2. Instead, such variations include circuitry, shared by a high-frequency-boosting tuning loop and a low-frequency-gain tuning loop, which generates an equalized signal in response to an input signal, including by applying a controllable gain to the input signal (or to low-frequency components of the input signal) and applying a controllable gain to high-frequency components of the input signal.

Figure 3:
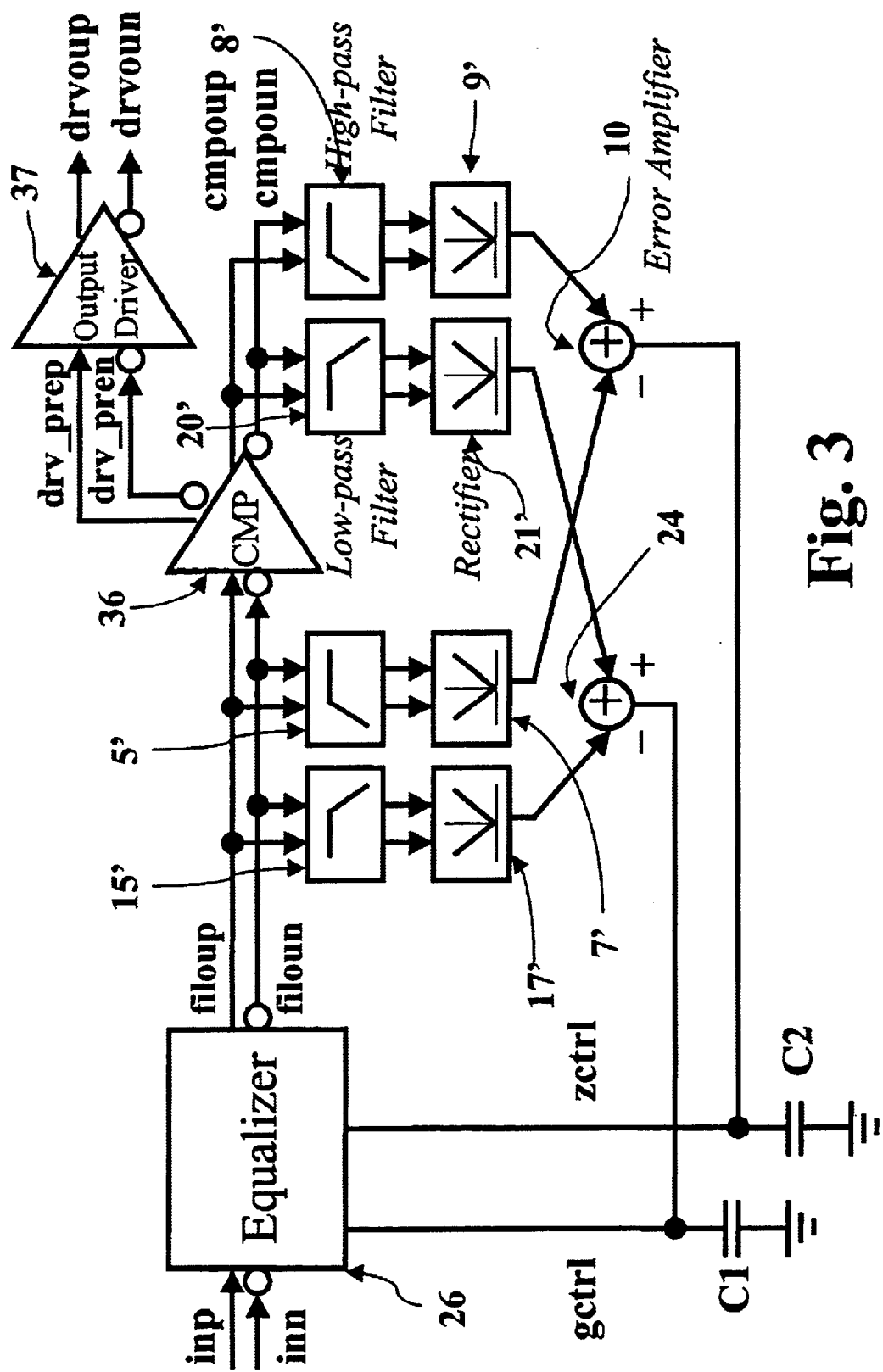
FIG. 3 is a simplified block diagram of an embodiment of the adaptive equalizer of the invention (with output driver 37).
Figure 4:
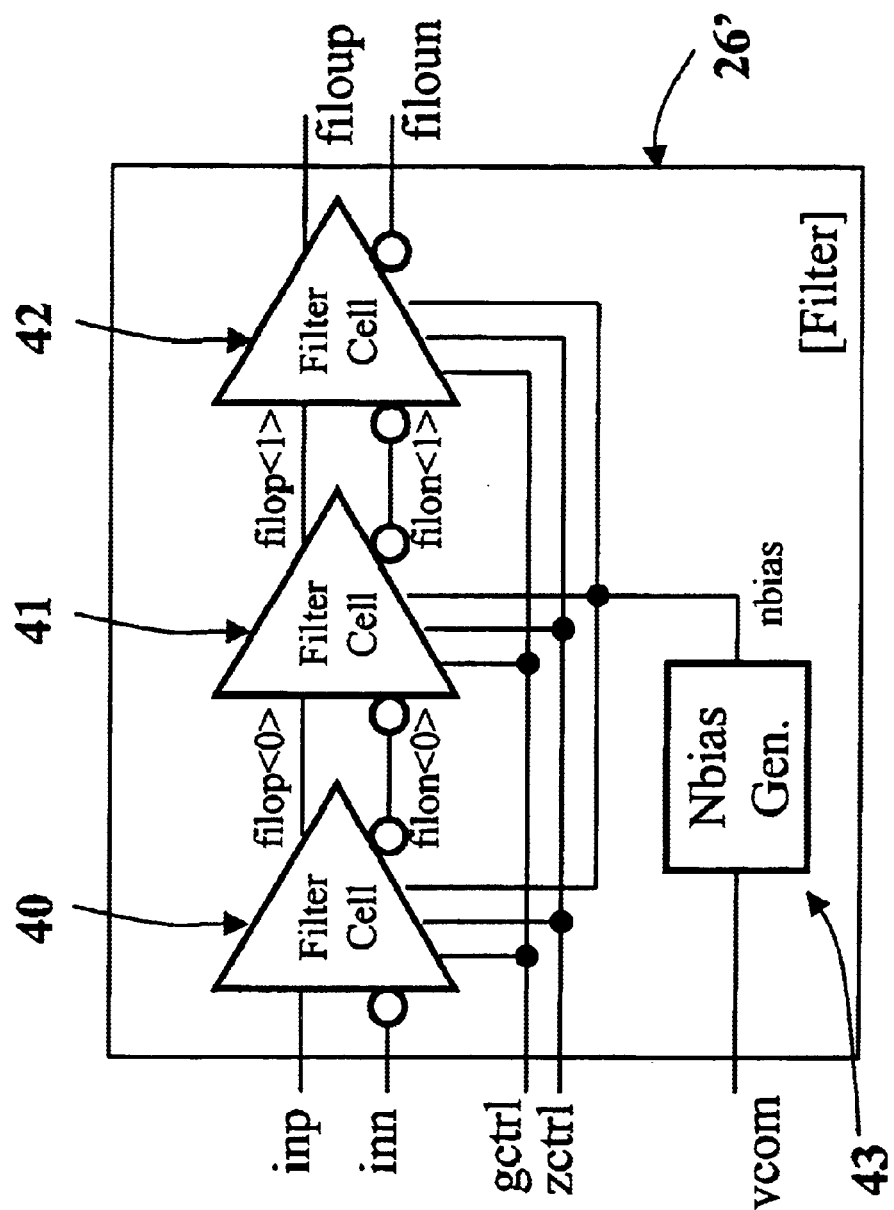
FIG. 4 is a block diagram of a preferred implementation of filter 26' of FIG. 3.

For example, filter 26' of FIG. 3 is a variation on filter 26 of FIG. 2. Filter 26' can be implemented as shown in FIG. 4 (to be described below) to include cells 40, 41, and 42, each shared by a high-frequency-boosting tuning loop and a low-frequency-gain tuning loop. Cells 40, 41, and 42 generate an equalized signal (the differential signal "filoup, filoun," asserted at the outputs of cell 42) in response to an input signal, including by applying a controllable gain to low-frequency components of the input signal and applying another, independently controllable gain to high-frequency components of the input signal.

With reference again to FIG. 2, to decide the amount of gain applied by low-frequency filter 1', the low-frequency-gain tuning loop compares the settled amplitude level of the comparator's input signal against that of the comparator's output (the input to comparator 16 is filtered in low-pass filter 15, the output of filter 15 is asserted to rectifier 17, the output of comparator 16 is filtered in low-pass filter 20, the output of filter 20 is asserted to rectifier 21, and error amplifier 24 asserts to the adjustable-gain element of filter 1' an equalization control signal indicative of the difference between the outputs of rectifiers 21 and 17). The control signal asserted by error amplifier 24 tries to make the settled amplitude level of the comparator's input and output signals the same.

FIG. 3 is a block diagram of an embodiment of the inventive adaptive equalizer, and output driver 37 (to be described below). It is contemplated that the FIG. 3 circuitry would typically be implemented as an integrated circuit. The elements of FIG. 3 that are identical to corresponding elements of FIG. 2 are numbered identically in FIGS. 2 and 3, and the foregoing description of them will not be repeated. Filter 26' of FIG. 3 is a variation on filter 26 of FIG. 2, in that filter 26' is configured to accept a differential input signal ("inp," "inn") and to assert a differential equalized signal ("filoup," "filoun") in response thereto. In use, the FIG. 3 equalizer is typically included in a receiver coupled to receive a differential input signal (the signal "inp," "inn") after the input signal has propagated over a cable. In FIG. 3, the low-frequency gain and high-frequency boosting paths within filter 26' are adjusted by a variation on the joint adaptation tuning loops of FIG. 2. In the joint adaptation tuning loops of FIG. 3, comparator 36 (having differential inputs and outputs) replaces comparator 16 of FIG. 2, low-pass filters 15' and 20' (having differential inputs and outputs) replace low-pass filters 15 and 20 of FIG. 2, high-pass filters 5' and 8' (having differential inputs and outputs) replace high-pass filters 5 and 8 of FIG. 2, and rectifiers 7', 9', 17', and 21' (having differential inputs) replace rectifiers 7, 9, 17, and 21 of FIG. 2.

In the FIG. 3 circuit, the equalization control signal output from error amplifier 10 is labeled "zctrl" and the equalization control signal output from error amplifier 24 is labeled "gctrl." The equalized, regulated differential signal asserted at the outputs of comparator 36 is labeled "cmpoup, cmpoun."

Figure 7:
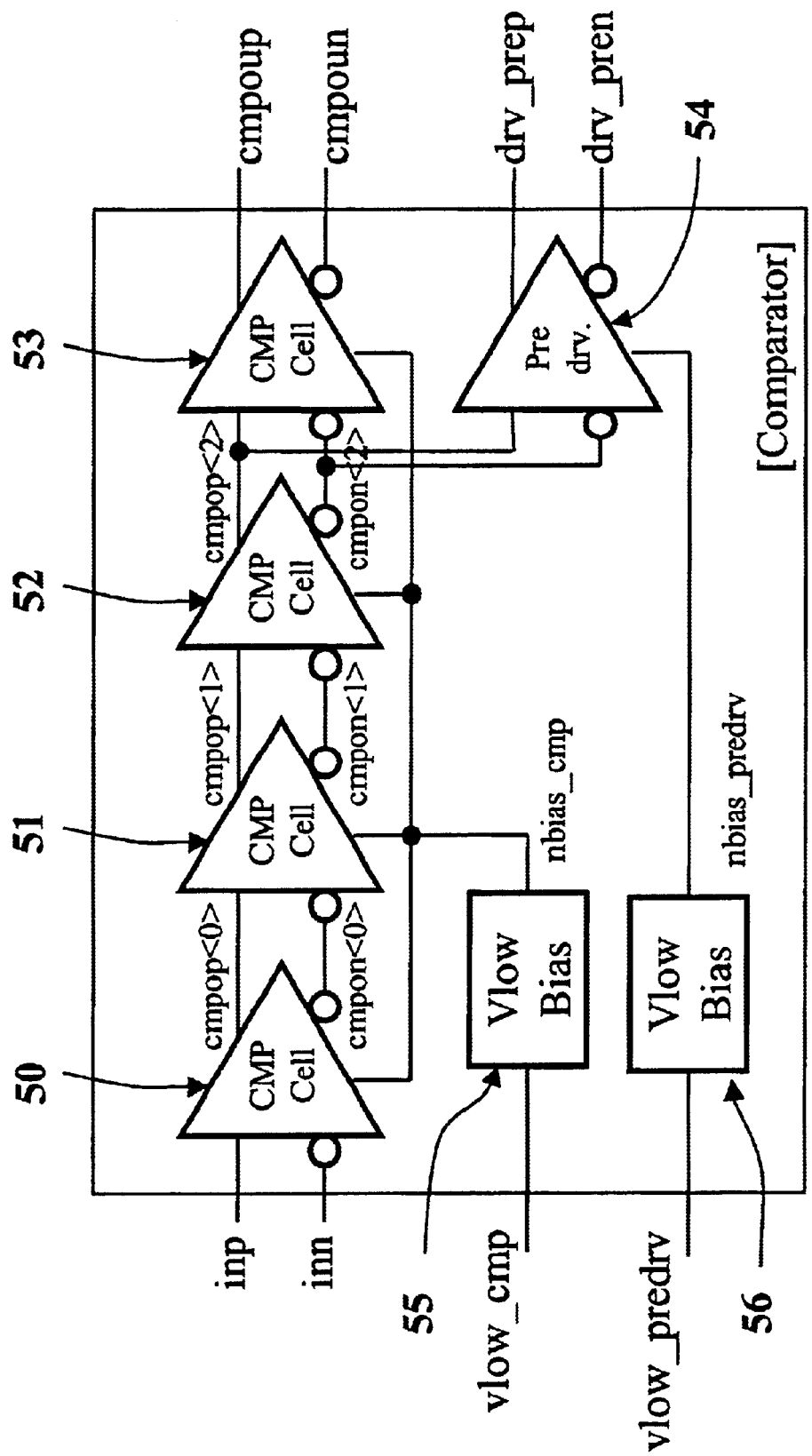
FIG. 7 is a block diagram of a preferred implementation of comparator 36 of FIG. 3.

In the FIG. 3 circuit, a signal internal to comparator 36 (differential signal "drv_prep, drv_pren," which is proportional or identical to the signal "cmpoup, cmpoun" asserted at the outputs of comparator 36) is tapped. The tapped signal, drv_prep, drv_pren, drives output buffer 37. Buffer 37 asserts differential output signal "drv_oup, drv_oun" in response to the tapped signal drv_prep, drv_pren. The signal separation provided by employing buffer 37 as an element separate from comparator 36 and coupled to an internal node of comparator 36 (where comparator 36 is typically implemented as a cascaded comparator as shown in FIG. 7) can alleviate load problems that might otherwise be present at the output of comparator 36.

Filter 26' of the FIG. 3 circuit is preferably implemented as shown in FIG. 4. The FIG. 4 implementation of filter 26' includes three cascaded filter cells (cells 40, 41, and 42, connected as shown) to obtain enough high-frequency boosting, bandwidth, and low-frequency-gain. Each of filter cells 40, 41, and 42 is controlled by the two equalization control signals "gctrl" (the low frequency gain control signal) and "zctrl" (the high frequency boosting control signal). Block 43 (labeled "Nbias Gen") is used to generate the common-mode output-voltage control signal "nbias" for the cells 40, 41, and 42 (which is asserted to each of cells 40, 41, and 42) in response to common-mode voltage reference signal "vcom."

Figure 6:
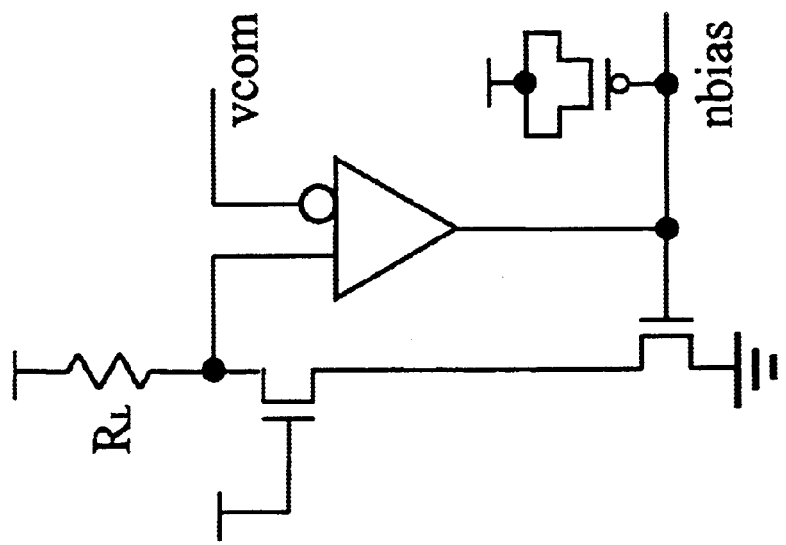
FIG. 6 is a schematic diagram of a preferred implementation of block 43 of FIG. 5.
Figure 5:
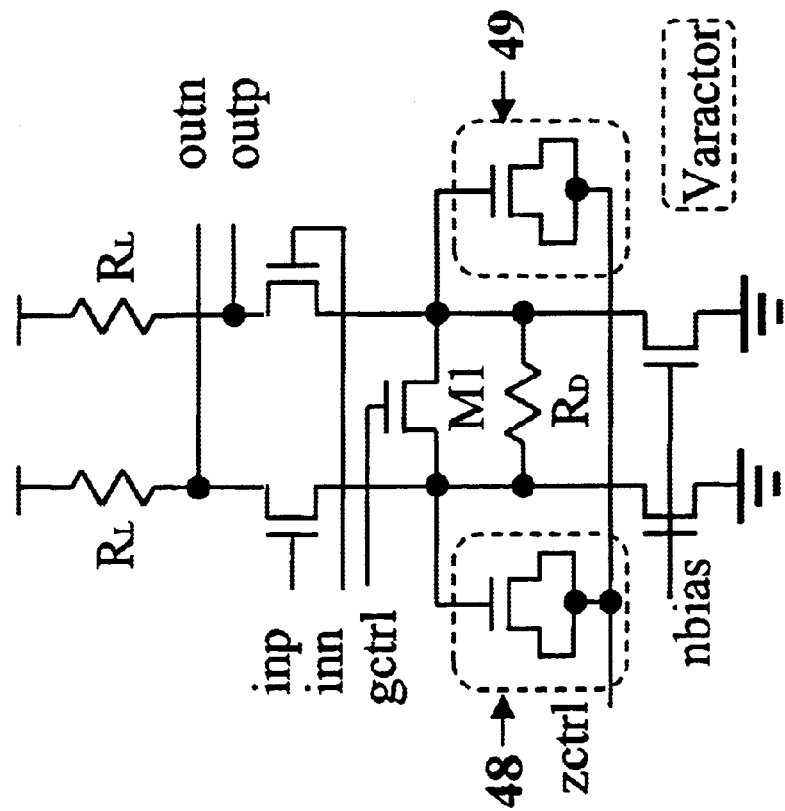
FIG. 5 is a schematic diagram of a preferred implementation of cell 40, 41, or 42 of FIG. 4.

Each of cells 40, 41, and 42 is preferably implemented as shown in FIG. 5, and block 43 is preferably implemented as shown in FIG. 6. The above-referenced paper by Babanezhad discloses a filter cell implemented with an op-amp based on negative feedback. This cell can set the dc-gain and high-frequency-boosting required in the FIG. 1 system. However, the negative feedback limits the operating frequency. The above-referenced paper by G. P. Hartman et al. discloses a filter cell in which the low frequency gain is determined by a diode-connected load. This structure also limits the operating frequency. The joint adaptation algorithm implemented by the FIG. 3 equalizer allows the exact low-frequency gain to be adapted (in response to the control signal "gctrl"). This allows cell 40, 41, or 42 to employ a simple tunable degeneration NMOS transistor (transistor M1 as shown in FIG. 5) to control low-frequency gain, rather than an op-amp based negative feedback structure or diode-connected load as in the prior art. The NMOS transistor structure of FIG. 5 provides variable low-frequency gain which can be used to compensate for low frequency amplitude variation in the signal being equalized. To reduce output parasitics, N+ poly resistors are used as the load resistors (labeled "$R_L$" in FIG. 5).

The FIG. 5 embodiment of cell 40, 41, or 42 is of a merged type (providing both high-frequency boosting and low-frequency gain), and its design minimizes the additional internal nodes required for each cell to provide low-frequency gain as well as high-frequency boosting, and enables high frequency operation.

In the FIG. 5 embodiment of cell 40, 41, or 42, high-frequency boosting is implemented using tunable source degeneration capacitors (Varactors 48 and 49). Because this varactor-based boosting technique is used, the common-mode control voltage (nbias) can be generated by the FIG. 6 implementation of block 43 of FIG. 4 using a replica biasing technique. Because the FIG. 6 biasing scheme (sometimes referred to as a feed-forward common-mode voltage biasing scheme) is used, there are no additional output loads to implement the common-mode-feedback (CMFB) circuit. The passive degeneration resistor (labeled "$R_D$") in FIG. 5 provides minimum low-frequency gain and it prevents the adaptive equalizer from reaching a zero (or too low) initial low-frequency-gain condition.

Variations on the FIG. 5 embodiment include tunable source degeneration capacitors that are not varactors, rather than Varactors 48 and 49. For example, some such variations include tunable source degeneration capacitors that are implemented as a programmable capacitor array by linear metal capacitors with transistor switches.

Figure 9:
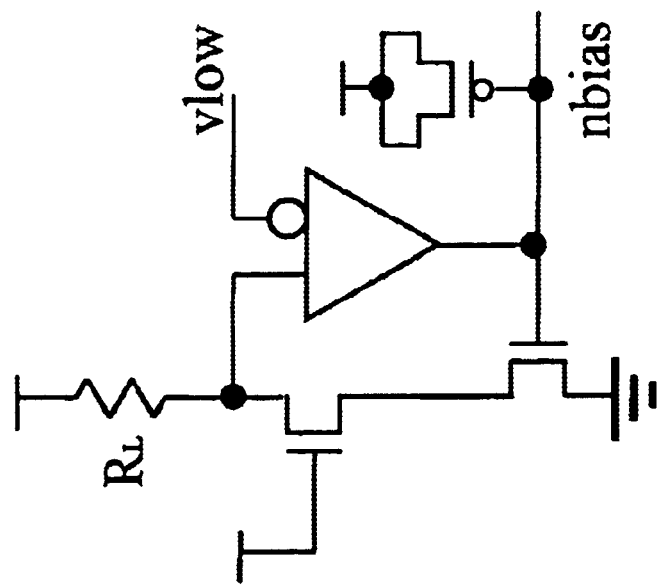
FIG. 9 is a schematic diagram of a preferred implementation of block 55 or 56 of FIG. 7.
Figure 8:
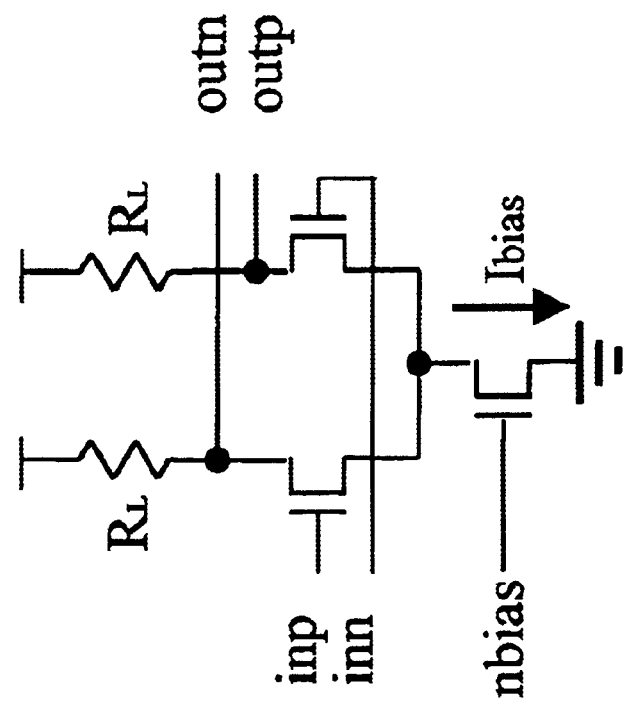
FIG. 8 is a schematic diagram of a preferred implementation of comparator cell 50, 51, 52, 53, or 54 of FIG. 7.

FIG. 7 is a block diagram of a preferred implementation of comparator 36 of FIG. 3. The FIG. 7 implementation of comparator 36 is cascaded, and includes four regulated comparator cells (50, 51, 52, and 53) to obtain enough gain and bandwidth. Comparator cell (pre-driver) 54 generates the above-mentioned tapped signal "drv_prep, drv_pren." Each of comparator cells 50, 51, 52, 53, and 54 is preferably implemented as shown in FIG. 8, as a simple differential amplifier with passive N+ poly resistor loads ("$R_L$"). The voltage regulation mechanism is as follows. The highest voltage level is determined by the supply voltage, and the level of the lowest voltage is determined by the biasing current and load resistor (i.e., $I_{bias}*R_L$ in FIG. 8). The bias potential "nbias_cmp" for each of cells 50, 51, 52, and 53 is generated by block 55 of FIG. 7 which is preferably implemented using a replica biasing technique as shown in FIG. 9. The bias potential "nbias_predrv" for cell 54 is generated by block 56 of FIG. 7 which is also preferably implemented using a replica biasing technique as shown in FIG. 9. By using minimum active elements, an implementation of regulated comparator 36 (that includes the FIG. 8 circuit) increases the regulated comparator's bandwidth compared with that of the comparator described in the above-referenced paper by G. P. Hartman et al. Because the cells of the regulated comparator of FIG. 7 have no high frequency boosting capability, and because the regulated comparator of FIG. 7 is loaded with high-pass filter 8' and low-pass filter 20' (as shown in FIG. 3), the signal buffering for output driver 37 is taken from the output of third regulated comparator cell 52. The output of cell 52 is asserted to cell 54 (whose outputs are coupled to the inputs of output driver 37) as well as to cell 53. Though the output loads of filter 26' and comparator 36 are different, the high frequency boosting capability of filter 26' can also compensate for these different loads.

Figure 10:
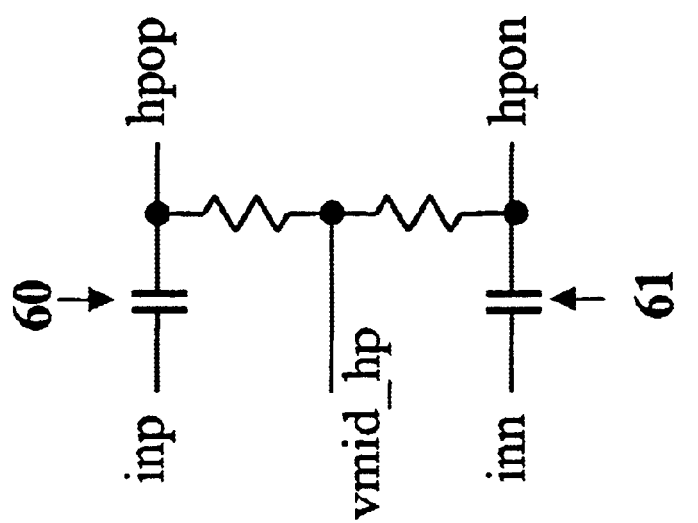
FIG. 10 is a schematic diagram of an embodiment of each high-pass filter of FIG. 3.
Figure 11:
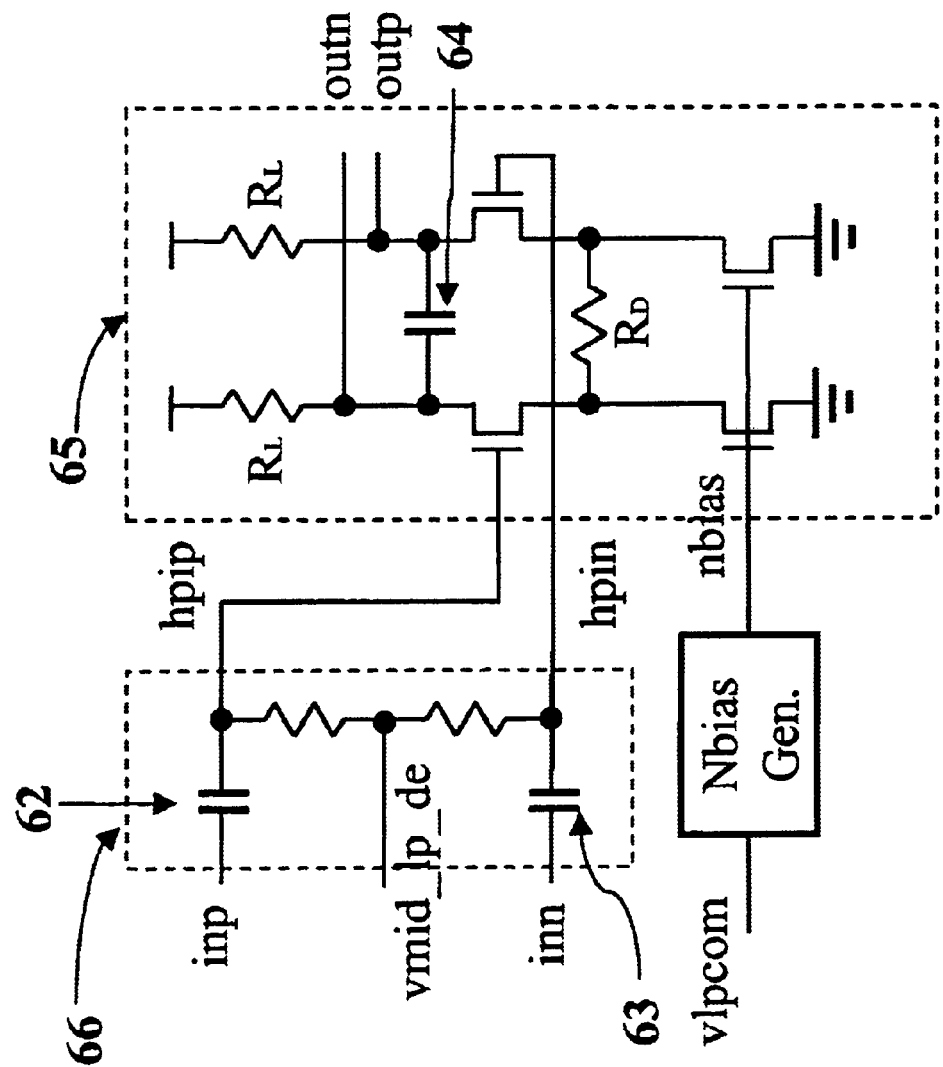
FIG. 11 is a schematic diagram of an embodiment of each low-pass filter of FIG. 3.

Because the output common-mode voltages of filter cell 42 and regulated comparator cell 53 are different, high-pass filters 5' and 8' and low-pass filters 15' and 20' should have DC-blocking capabilities. When implemented as shown in FIG. 10, each high-pass filter has inherent DC-blocking capabilities. Each low-pass filter can be implemented as shown in FIG. 11. Capacitors 60, 61, 62, 63, and 64 in the filters of FIGS. 10 and 11 are implemented by interdigitated metal capacitors in some embodiments.

Because low-pass filtering portion 65 of the low-pass filter of FIG. 11 has no DC-blocking capabilities, the FIG. 11 filter includes DC-decoupling high-pass filter 66, which is coupled to the input of portion 65. Low-pass filter 65 is implemented as a source degenerated differential amplifier with the loads of N+ poly resistors "$R_L$" and capacitor 64. Because this low-pass filter has infinite input impedance, the cascaded transfer function of the decoupling high-pass filter and active low-pass filter can be maintained without any degradation.

Figure 13:
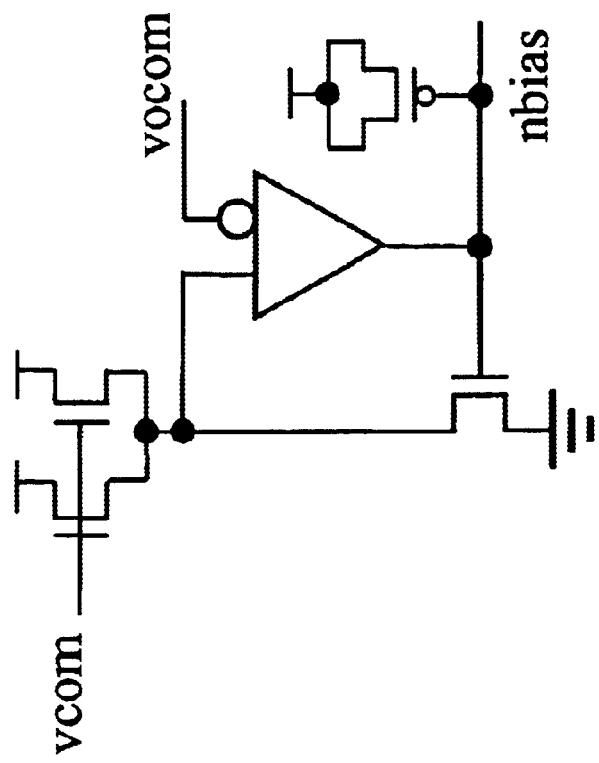
FIG. 13 is a schematic diagram of an embodiment of a circuit for generating biasing potential "nbias" for the rectifier of FIG. 12.
Figure 12:
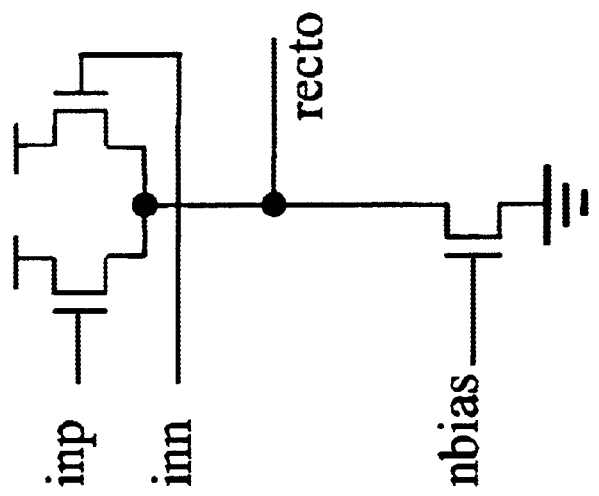
FIG. 12 is a schematic diagram of an embodiment of each rectifier of FIG. 3.

Each of rectifiers 7', 17', 9', and 21' can have a conventional design, such as that shown in FIG. 12, with biasing potential "nbias" generated by the replica biasing circuit of FIG. 13 in response to control voltages "vcom" and "vocom."

Figure 14:
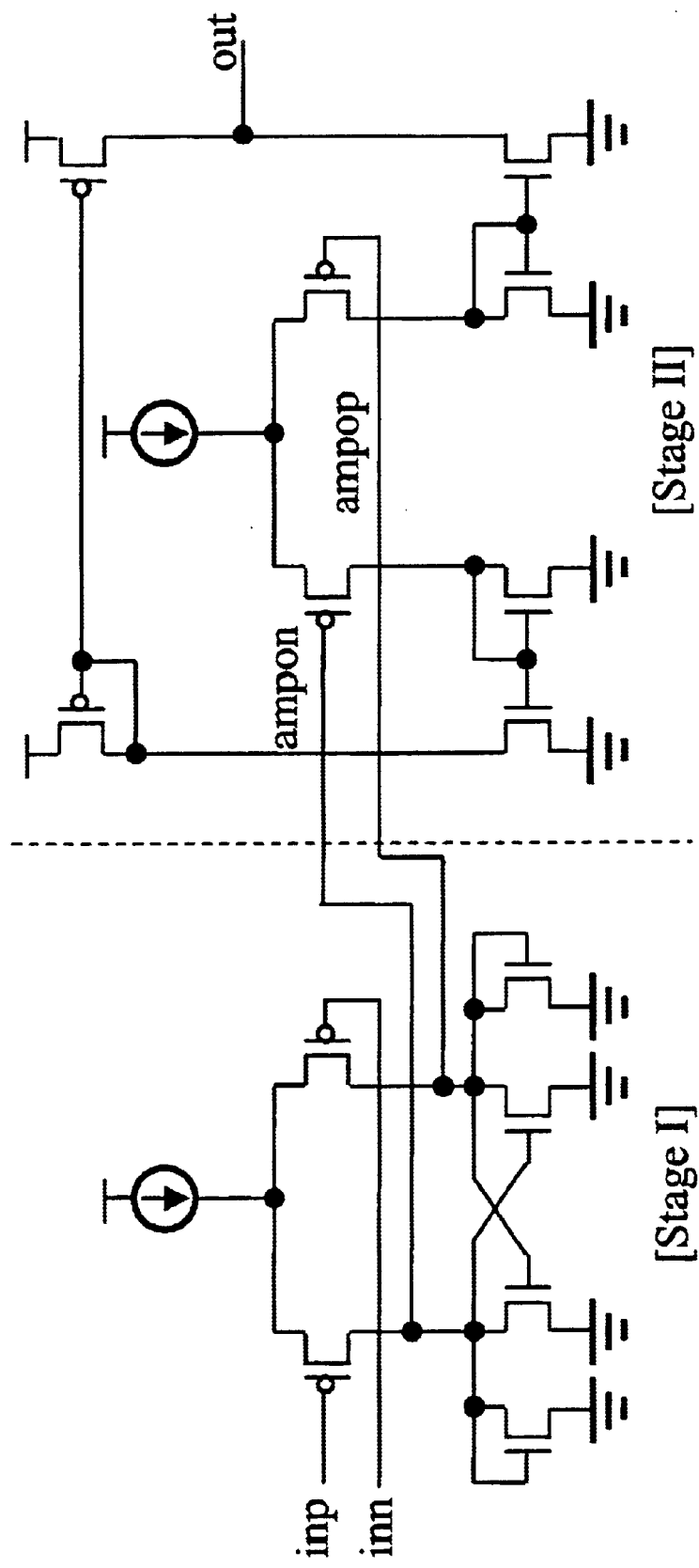
FIG. 14 is a schematic diagram of an embodiment of each error amplifier of FIG. 3.

Each of error amplifiers 10 and 24 is preferably implemented as a two-stage amplifier as shown in FIG. 14. The first stage of the amplifier gives high gain with negative-gm loads and the second stage of the amplifier gives almost rail-to-rail output voltage ranges for the proper control of the degeneration transistor and varactors of FIG. 5.

It should be understood that while some embodiments of the present invention are illustrated and described herein, the invention is not to be limited to the specific embodiments described and shown.

What is claimed is:

1. An adaptive equalization circuit that implements a joint adaptation algorithm to generate an equalized signal in response to an input signal, said adaptive equalization circuit including:

a low-frequency tuning loop including a low-frequency filter coupled and configured to apply a first controllable gain to one of the input signal and low-frequency components of the input signal, wherein the low-frequency tuning loop is configured to control the gain applied by the low-frequency filter to said one of the input signal and the low-frequency components of the input signal; and a high-frequency tuning loop including a high-frequency filter coupled and configured to apply a second controllable gain to high-frequency components of the input signal, wherein the high-frequency tuning loop is configured to control the gain applied by the high-frequency filter to the high-frequency components of the input signal, wherein the low-frequency filter and the high-frequency filter share at least one shared circuit element, and the shared circuit element has at least one output at which the equalized signal is asserted.

2. The circuit of claim 1, wherein the shared circuit element is a set of cascaded filter cells, and each of the filter cells is configured to operate in response to at least one control signal from each of the low-frequency tuning loop and the high-frequency tuning loop.

3. The circuit of claim 2, wherein each of the filter cells includes at least one tunable source degeneration capacitor.

4. The circuit of claim 3, wherein the high-frequency tuning loop is configured to assert at least one said control signal to each said tunable source degeneration capacitor to control the gain applied by the high-frequency filter to the high-frequency components of the input signal.

5. The circuit of claim 1, wherein the low-frequency filter is configured to generate a first amplified signal by applying the first controllable gain to said one of the input signal and the low-frequency components of the input signal, the high-frequency filter is configured to generate a second amplified signal by applying the second controllable gain to the high-frequency components of the input signal, and the shared circuit element is an adder coupled and configured to generate the equalized signal by adding the first amplified signal to the second amplified signal.

6. The circuit of claim 1, wherein the low-frequency filter is configured to generate a first amplified signal by applying the first controllable gain to said one of the input signal and the low-frequency components of the input signal, the high-frequency filter is configured to generate a second amplified signal by applying the second controllable gain to the high-frequency components of the input signal, and the shared circuit element is a combining circuit coupled and configured to generate the equalized signal by combining the first amplified signal and the second amplified signal.

7. The circuit of claim 1, wherein the low-frequency filter is configured to receive the input signal and apply the first controllable gain to the input signal.

8. The circuit of claim 1, wherein the high-frequency filter includes:

a high-pass filter coupled and configured to receive the input signal and assert the high-frequency components of the input signal in response to the input signal; and an amplifier having an input coupled to the high-pass filter, wherein the amplifier is configured to apply the second controllable gain to the high-frequency components of the input signal.

9. The circuit of claim 1, wherein the high-frequency tuning loop includes:

a comparator having at least one input coupled to receive the equalized signal and at least one output;

a first high-pass filter coupled to at least one said input of the comparator;

a second high-pass filter coupled to at least one said output of the comparator;

a first rectifier coupled to an output of the first high-pass filter;

a second rectifier coupled to an output of the second high-pass filter; and an error amplifier, coupled to the high-frequency filter, and configured to generate an equalization control signal in response to outputs of the first rectifier and the second rectifier and to assert the equalization control signal to the high-frequency filter.

10. The circuit of claim 9, wherein the low-frequency tuning loop shares the comparator with the high-frequency tuning loop, and the low-frequency tuning loop also includes:

a first low-pass filter coupled to at least one said input of the comparator;

a second low-pass filter coupled to at least one said output of the comparator;

a third rectifier coupled to an output of the first low-pass filter;

a fourth rectifier coupled to an output of the second low-pass filter; and a second error amplifier, coupled to the low-frequency filter and configured to generate a second equalization control signal in response to outputs of the third rectifier and the fourth rectifier and to assert the second equalization control signal to the low-frequency filter.

11. The circuit of claim 10, wherein the first low-pass filter includes a first DC-decoupling high-pass filter coupled to at least one said output of the comparator, and the second low-pass filter includes a second DC-decoupling high-pass filter coupled to at least one said output of the comparator.

12. The circuit of claim 9, wherein the comparator is a regulating comparator.

13. A receiver coupled to receive an input signal and configured to implement a joint adaptation algorithm to generate an equalized signal in response to the input signal, said receiver including:

a low-frequency tuning loop including a low-frequency filter coupled and configured to apply a first controllable gain to one of the input signal and low-frequency components of the input signal, wherein the low-frequency tuning loop is configured to control the gain applied by the low-frequency filter to said one of the input signal and the low-frequency components of the input signal; and a high-frequency tuning loop including a high-frequency filter coupled and configured to apply a second controllable gain to high-frequency components of the input signal, wherein the high-frequency tuning loop is configured to control the gain applied by the high-frequency filter to the high-frequency components of the input signal, wherein the low-frequency filter and the high-frequency filter share at least one shared circuit element, and the shared circuit element has at least one output at which the equalized signal is asserted.

14. The receiver of claim 13, wherein the shared circuit element is a set of cascaded filter cells, and each of the filter cells is configured to operate in response to at least one control signal from each of the low-frequency tuning loop and the high-frequency tuning loop.

15. The receiver of claim 14, wherein each of the filter cells includes at least one tunable source degeneration capacitor.

16. The receiver of claim 15, wherein the high-frequency tuning loop is configured to assert at least one said control signal to each said tunable source degeneration capacitor to control the gain applied by the high-frequency filter to the high-frequency components of the input signal.

17. The receiver of claim 13, wherein the low-frequency filter is configured to generate a first amplified signal by applying the first controllable gain to said one of the input signal and the low-frequency components of the input signal, the high-frequency filter is configured to generate a second amplified signal by applying the second controllable gain to the high-frequency components of the input signal, and the shared circuit element is an adder coupled and configured to generate the equalized signal by adding the first amplified signal to the second amplified signal.

18. The receiver of claim 13, wherein the low-frequency filter is configured to generate a first amplified signal by applying the first controllable gain to said one of the input signal and the low-frequency components of the input signal, the high-frequency filter is configured to generate a second amplified signal by applying the second controllable gain to the high-frequency components of the input signal, and the shared circuit element is a combining circuit coupled and configured to generate the equalized signal by combining the first amplified signal and the second amplified signal.

19. The receiver of claim 13, wherein the low-frequency filter is configured to receive the input signal and apply the first controllable gain to the input signal.

20. The receiver of claim 13, wherein the high-frequency filter includes:

a high-pass filter coupled and configured to receive the input signal and assert the high-frequency components of the input signal in response to the input signal; and an amplifier having an input coupled to the high-pass filter, wherein the amplifier is configured to apply the second controllable gain to the high-frequency components of the input signal.

21. The receiver of claim 13, wherein the high-frequency tuning loop includes:

a comparator having at least one input coupled to receive the equalized signal and at least one output;

a first high-pass filter coupled to at least one said input of the comparator;

a second high-pass filter coupled to at least one said output of the comparator;

a first rectifier coupled to an output of the first high-pass filter;

a second rectifier coupled to an output of the second high-pass filter; and an error amplifier, coupled to the high-frequency filter, and configured to generate an equalization control signal in response to outputs of the first rectifier and the second rectifier and to assert the equalization control signal to the high-frequency filter.

22. The receiver of claim 21, wherein the low-frequency tuning loop shares the comparator with the high-frequency tuning loop, and the low-frequency tuning loop also includes:

a first low-pass filter coupled to at least one said input of the comparator;

a second low-pass filter coupled to at least one said output of the comparator;

a third rectifier coupled to an output of the first low-pass filter;

a fourth rectifier coupled to an output of the second low-pass filter; and a second error amplifier, coupled to the low-frequency filter and configured to generate a second equalization control signal in response to outputs of the third rectifier and the fourth rectifier and to assert the second equalization control signal to the low-frequency filter.

23. The receiver of claim 22, wherein the first low-pass filter includes a first DC-decoupling high-pass filter coupled to at least one said input of the comparator, and the second low-pass filter includes a second DC-decoupling high-pass filter coupled to at least one said output of the comparator.

24. The receiver of claim 21, wherein the comparator is a regulating comparator.

25. A joint adaptive equalization method for generating an equalized signal in response to an input signal, said method including the steps of:

(a) operating a low-frequency tuning loop that includes a low-frequency filter to cause the low-frequency filter to apply a first gain to one of the input signal and low-frequency components of the input signal, while operating a high-frequency tuning loop that includes a high-frequency filter to cause the high-frequency filter to apply a second gain to high-frequency components of the input signal, wherein the low-frequency tuning loop controls the first gain, the high-frequency tuning loop controls the second gain, the first gain is controlled independently from the second gain, and the low-frequency filter and the high-frequency filter share at least one shared circuit element; and (b) while performing step (a), asserting the equalized signal at at least one output of the shared circuit element.

26. The method of claim 25, wherein the shared circuit element is a set of cascaded filter cells, and step (a) includes the step of operating the filter cells in response to at least one control signal from each of the low-frequency tuning loop and the high-frequency tuning loop.

27. The method of claim 25, wherein the shared circuit element is a set of cascaded filter cells, each of the filter cells includes at least one tunable source degeneration capacitor, and step (a) includes the step of operating the filter cells in response to at least one control signal from each of the low-frequency tuning loop and the high-frequency tuning loop.

28. The method of claim 27, wherein step (a) includes the step of operating the high-frequency tuning loop to assert at least one said control signal to each said tunable source degeneration capacitor to control the second gain applied to the high-frequency components of the input signal.

29. The method of claim 25, wherein step (a) includes the steps of causing the low-frequency filter to generate a first amplified signal by applying the first gain to said one of the input signal and the low-frequency components of the input signal, and causing the high-frequency filter to generate a second amplified signal by applying the second gain to the high-frequency components of the input signal, and step (b) includes the step of generating the equalized signal by combining the first amplified signal and the second amplified signal.

30. The method of claim 25, wherein step (a) includes the step of causing the low-frequency filter to apply the first gain to the input signal.

31. The method of claim 25, wherein the high-frequency tuning loop includes a comparator coupled to receive the equalized signal, wherein the comparator asserts a comparator output signal in response to the equalized signal, and wherein step (a) includes the steps of:

generating a first high-pass filtered signal by high-pass filtering the equalized signal;

generating a first rectified signal by rectifying the first high-pass filtered signal;

generating a second high-pass filtered signal by high-pass filtering the comparator output signal;

generating a second rectified signal by rectifying the second high-pass filtered signal; and generating an equalization control signal in response to first rectified signal and the second rectified signal, and asserting the equalization control signal to the high-frequency filter.

32. The method of claim 31, wherein the low-frequency tuning loop shares the comparator with the high-frequency tuning loop, and wherein step (a) includes the steps of:

generating a first low-pass filtered signal by low-pass filtering the equalized signal;

generating a third rectified signal by rectifying the first low-pass filtered signal;

generating a second low-pass filtered signal by low-pass filtering the comparator output signal;

generating a fourth rectified signal by rectifying the second low-pass filtered signal; and generating a second equalization control signal in response to third rectified signal and the fourth rectified signal, and asserting the second equalization control signal to the low-frequency filter.

* * * * *

UNITED STATES PATENT AND TRADEMARK OFFICE
CERTIFICATE OF CORRECTION

PATENT NO. : 6,819,166 B1
DATED : November 16, 2004
INVENTOR(S) : Jong-Sang Choi et al.

It is certified that error appears in the above-identified patent and that said Letters Patent is hereby corrected as shown below:

<u>Column 4,</u>
Line 5, "6" should be -- 16 --.

Signed and Sealed this

First Day of February, 2005

JON W. DUDAS
*Director of the United States Patent and Trademark Office*